(12) United States Patent
Shiraishi

(10) Patent No.: US 9,589,589 B2
(45) Date of Patent: Mar. 7, 2017

(54) SPINDLE MOTOR WITH SEALING MEMBER INCLUDING FLANGE AND DISK DRIVE APPARATUS INCLUDING SAME

(71) Applicant: Nidec Corporation, Kyoto (JP)

(72) Inventor: Masahiro Shiraishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/180,249

(22) Filed: Jun. 13, 2016

(65) Prior Publication Data

US 2017/0025145 A1   Jan. 26, 2017

(30) Foreign Application Priority Data

Jul. 24, 2015   (JP) .................................. 2015-146264

(51) Int. Cl.
  *G11B 19/20*   (2006.01)
  *H02K 5/124*   (2006.01)
  (Continued)

(52) U.S. Cl.
  CPC ......... *G11B 19/2009* (2013.01); *H02K 5/124* (2013.01); *H02K 5/1677* (2013.01);
  (Continued)

(58) Field of Classification Search
  None
  See application file for complete search history.

(56) References Cited

U.S. PATENT DOCUMENTS 7,088,023 B1 *   8/2006   Gomyo et al. ..... G11B 19/2009
                                                    310/67 R
2004/0232781 A1 *   11/2004   Yoo .................... G11B 19/2009
                                                    360/98.07
(Continued)

FOREIGN PATENT DOCUMENTS

JP   2002-64953 A    2/2002
JP   2002-310146 A   10/2002
(Continued)

OTHER PUBLICATIONS

Takahashi et al.; "Spindle Motor and Disk Drive Apparatus"; U.S. Appl. No. 15/046,760; filed Feb. 18, 2016.
(Continued)

*Primary Examiner* — Craig A. Renner
(74) *Attorney, Agent, or Firm* — Keating & Bennett, LLP

(57) ABSTRACT

A motor may include a bearing mechanism including a shaft arranged along a center axis, a sealing member has one-end closed cylindrical shape and a recess receiving a lower portion of the bearing mechanism, a stationary portion including a base defining a part of the housing, and a rotary portion rotating relative to the stationary portion about the center axis. The base has a through hole defined therein so as to have a center aligned with the center axis and pass through the base in an axial direction. The sealing member is fixed in a fixing region defined between an outer circumferential portion of the sealing member and an inner circumferential portion that defines the through hole in the base. The fixing region includes a sealing region where a clearance between the sealing member and the base is closed.

10 Claims, 11 Drawing Sheets

(51) Int. Cl.
*H02K 5/167* (2006.01)
*H02K 15/14* (2006.01)

(52) U.S. Cl.
CPC .......... *H02K 15/14* (2013.01); *F16C 2370/12* (2013.01); *G11B 19/2036* (2013.01)

(56) References Cited

U.S. PATENT DOCUMENTS

| | | | | |
|---|---|---|---|---|
| 2005/0274018 | A1* | 12/2005 | Gomyo et al. | G11B 19/2018 310/40 R |
| 2006/0268453 | A1 | 11/2006 | Watanabe et al. | |
| 2008/0024024 | A1* | 1/2008 | Tamaoka | H02K 15/14 310/90 |
| 2010/0328819 | A1* | 12/2010 | Shinji et al. | G11B 19/2009 360/244 |
| 2011/0279925 | A1* | 11/2011 | Watanabe et al. | G11B 19/2036 360/99.08 |
| 2012/0176700 | A1* | 7/2012 | Shinji | G11B 25/043 360/97.21 |
| 2014/0147065 | A1* | 5/2014 | Sugiki | F16C 17/026 384/107 |
| 2014/0355154 | A1* | 12/2014 | Sugiki | G11B 19/2036 360/99.08 |

FOREIGN PATENT DOCUMENTS

| | | |
|---|---|---|
| JP | 2004-301154 A | 10/2004 |
| JP | 2004-364398 A | 12/2004 |
| JP | 2008-79421 A | 4/2008 |

OTHER PUBLICATIONS

Yoneda et al.; "Spindle Motor and Disk Drive Apparatus"; U.S. Appl. No. 15/176,308; filed Jun. 8, 2016.

* cited by examiner

SPINDLE MOTOR WITH SEALING MEMBER INCLUDING FLANGE AND DISK DRIVE APPARATUS INCLUDING SAME

BACKGROUND OF THE INVENTION

1. Field of the Invention

An exemplary preferred embodiment of the disclosure relates to a spindle motor for a disk drive apparatus.

2. Description of the Related Art

A disk drive apparatus such as a hard disk drive apparatus has been required to control, for example, the rotation of a disk and the movement of a head more accurately with an increase in recording density of a disk. A hard disk drive (HDD) has an interior space filled with a low-density gas such as helium or hydrogen to reduce resistance to be applied to a disk and a head in rotating a spindle motor. This configuration reduces the vibrations of the disk and head and achieves highly accurate data recording.

One of known HDDs is equipped with a spindle motor (hereinafter, simply referred to as a "motor") that includes a base defining a part of a housing of the HDD.

If the HDD is filled with helium or hydrogen of considerably small molecular weight, the gas is frequently leaked out of the housing through a clearance between members of the HDD. Consequently, the HDD has been required to seal the clearance, thereby preventing the passage of the gas more than before. The clearance is sealed with, for example, a rubber ball that prevents the passage of gas. However, the use of a sealing member made of an elastic material such as rubber raises a possibility in that a helium gas is leaked through a slight clearance between the sealing member and a through hole. In addition, the helium gas has a small particle size and therefore escapes to the outside through the rubber ball in some cases.

SUMMARY OF THE INVENTION

An exemplary preferred embodiment of the disclosure provides a spindle motor sed in a disk drive apparatus to drive a disk. The disk drive apparatus includes a housing defining an interior space. The spindle motor includes a bearing mechanism, a sealing member, a stationary portion, and a rotary portion. The bearing mechanism includes a shaft arranged along a center axis extending in a lengthwise direction. The sealing member has a one-end closed cylindrical shape and has a recess receiving a lower portion of the bearing mechanism. The stationary portion includes a base defining a part of the housing. The rotary portion is arranged to rotate relative to the stationary portion about the center axis via the bearing mechanism. The base has a through hole defined therein so as to have a center aligned with the center axis and pass through the base in an axial direction. The sealing member is fitted into and fixed to the through hole. The sealing member is fixed in a fixing region defined between an outer circumferential portion of the sealing member and an inner circumferential portion that defines the through hole in the base. The fixing region includes a sealing region where a clearance defined between the sealing member and the base is closed.

The above and other elements, features, steps, characteristics and advantages of the present invention will become more apparent from the following detailed description of the preferred embodiments with reference to the attached drawings. The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An exemplary motor and an exemplary disk drive apparatus will be described below. In the following description referring to the accompanying drawings, the upper side and lower side of a motor in a direction of a center axis of the motor will be simply referred to as "upper side" and "lower side", respectively. Moreover, a direction parallel to the center axis will be referred to as "axially" or "axial direction". A radial direction from the center axis will be simply referred to as "radially" or "radial direction". A circumferential direction about the center axis will be simply referred to as "circumferentially" or "circumferential direction". However, the directional definitions are not intended to limit the orientations of a motor and a disk drive apparatus in manufacturing and using the motor and the disk drive apparatus.

Figure 1:
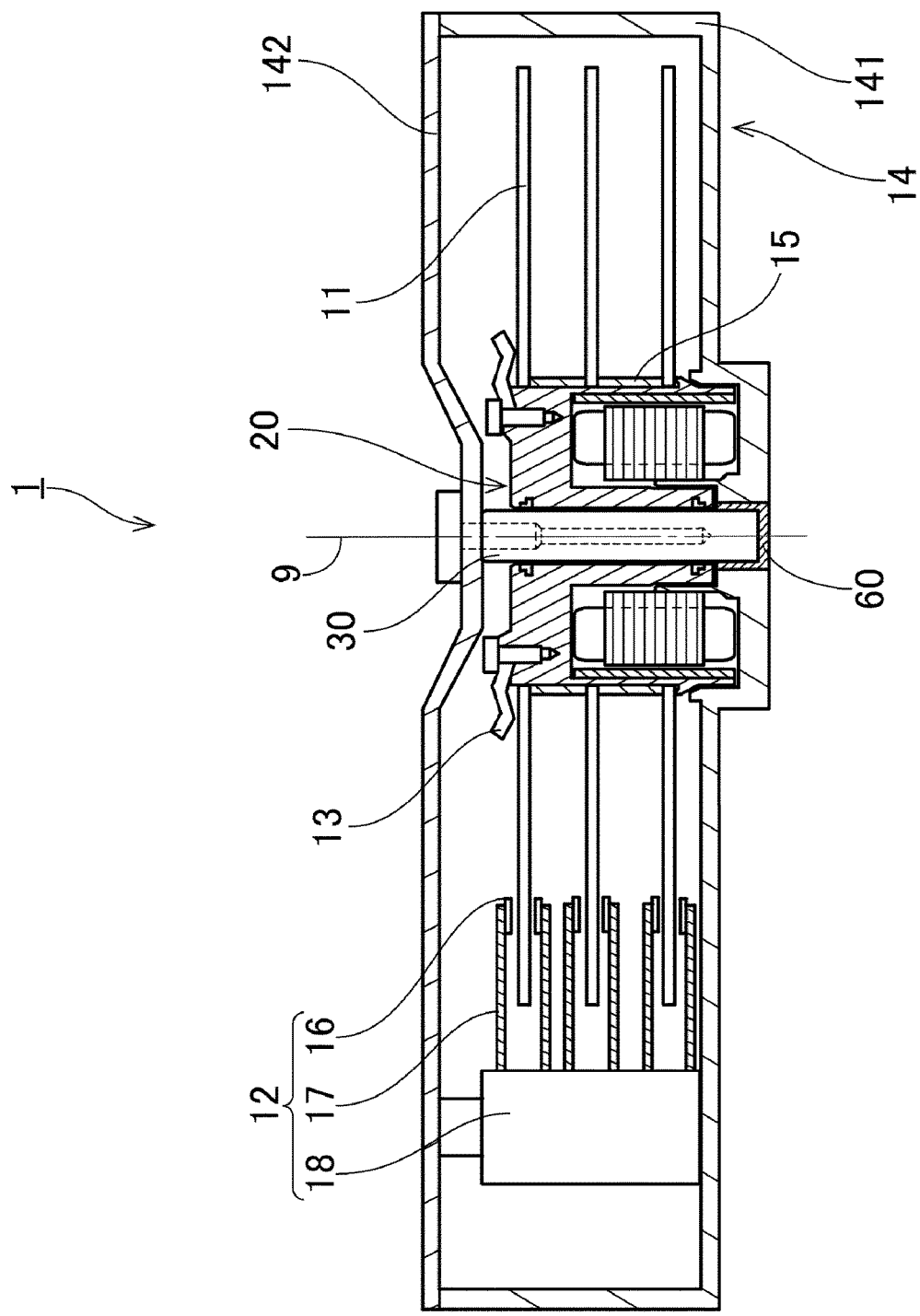
FIG. 1 is a longitudinal sectional view of a disk drive apparatus according to a first preferred embodiment.

FIG. 1 is a longitudinal sectional view of a disk drive apparatus 1. The disk drive apparatus 1 is equipped with a motor according to a first preferred embodiment. The disk drive apparatus 1 is arranged to read and write data from and to a magnetic disk while rotating the magnetic disk. As illustrated in FIG. 1, the disk drive apparatus 1 preferably includes three magnetic disks 11, an access unit 12, a clamper 13, and a housing 14 in addition to the motor 20.

The housing 14 preferably accommodates at least a part of the motor 20, the three magnetic disks 11, the clamper 13, and the access unit 12. The housing 14 includes a first housing member 141 of an open box shape and a second housing member 142 formed of a plate-like top cover. The housing 14 has an interior space formed therein in such a manner that the first housing member 141 and the second housing member 142 are bonded together by, for example, welding.

The interior space in the housing 14 is preferably a clean space where there is no or substantially no dirt or dust intrusion. In the disk drive apparatus 1, the housing 14 is preferably filled with a helium gas. The housing 14 may be filled with, for example, air, a hydrogen gas, or a nitrogen gas in place of the helium gas. The housing 14 may also be filled with a mixture of these gases.

The motor 20 rotates the three magnetic disks 11 about a center axis 9 while supporting the magnetic disks 11. The three magnetic disks 11 are arranged in the axial direction with a spacer interposed therebetween. The three magnetic disks 11 are clamped by the clamper 13 and the motor 20. The access unit 12 preferably includes six heads 16, six arms 17 respectively supporting the heads 16, and a head movement mechanism 18. The heads 16 is arranged to read and write data from and to the corresponding magnetic disks 11 in proximity to the magnetic disks 11. The head movement mechanism 18 is arranged to actuate the arms 17 to move the heads 16 relative to the magnetic disks 11.

With this configuration, the heads 16 respectively access desired positions of the rotating magnetic disks 11 to read and write data from and to the magnetic disks 11. In the disk drive apparatus 1, the number of magnetic disks 11 may be one, two, or not less than four. The access unit 12 may perform at least one of data read from and data write to the magnetic disks 11. Examples of a disk to be employed herein may include an optical disk and the like in addition to a magnetic disk.

Figure 2:
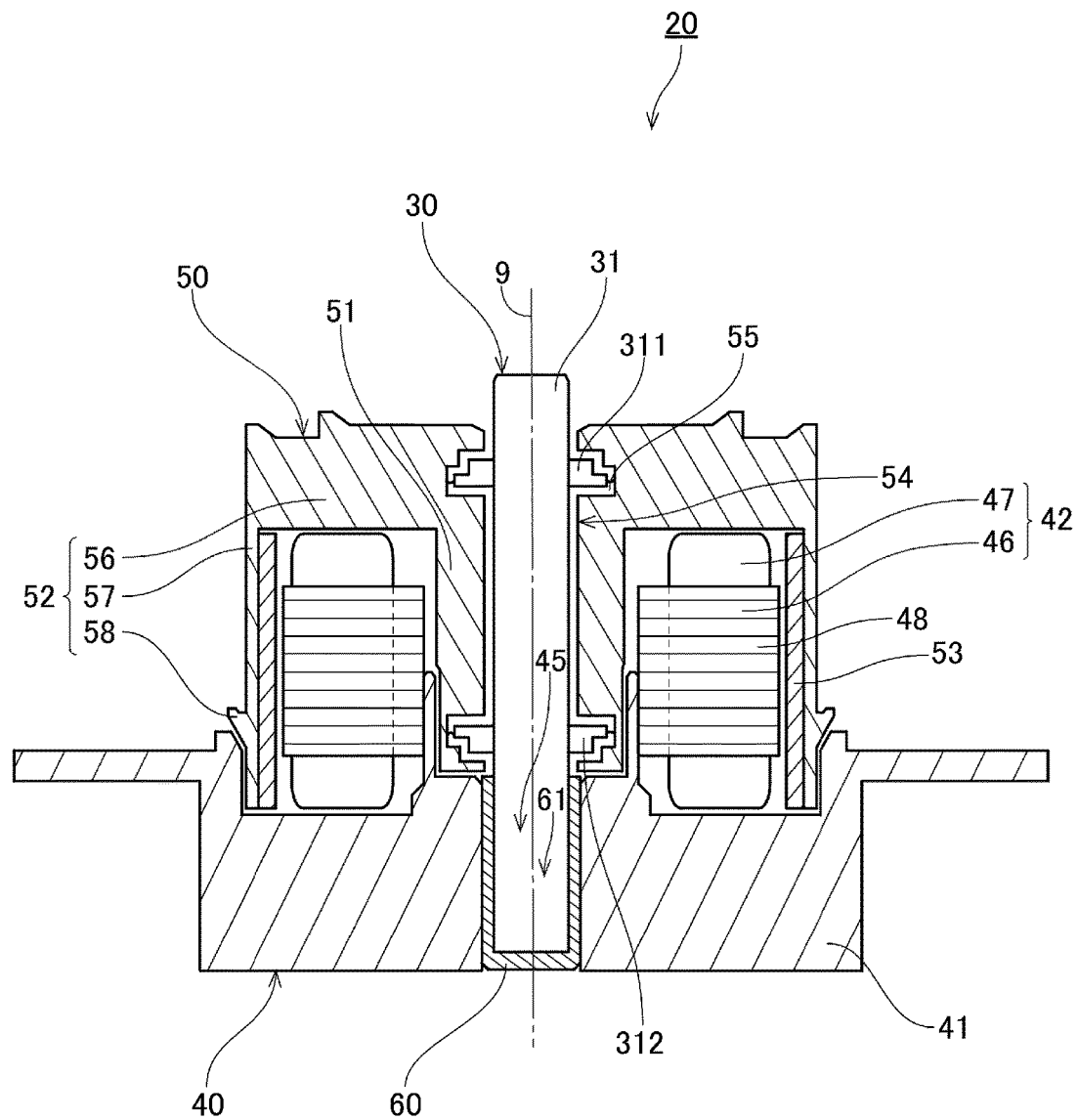
FIG. 2 is a longitudinal sectional view of a motor according to a first preferred embodiment.

Next, description will be given of a detailed configuration of the motor 20 for use in the disk drive apparatus 1. FIG. 2 is a longitudinal sectional view of the motor 20 according to the first preferred embodiment. The motor 20 is of a so-called outer rotor type in which a magnet is disposed radially outside a stator. The motor 20 preferably includes a bearing mechanism 30, a stationary portion 40, a rotary portion 50, and a sealing member 60.

The bearing mechanism 30 preferably includes a shaft 31 arranged in the axial direction, an upper thrust member 311 having a ring or substantially ring shape, and a lower thrust member 312 having a ring or substantially ring shape. The shaft 31 has a columnar shape and is arranged to extend along the center axis 9. The upper thrust member 311 is fixed to an outer circumferential surface of the shaft 31. The lower thrust member 312 is fixed to the outer circumferential surface of the shaft 31 below the upper thrust member 311.

The shaft 31 is made of, for example, aluminum, an aluminum alloy, or a stainless alloy. The shaft 31 is subjected to heat treatment such as quenching. This heat treatment improves the hardness of the outer circumferential surface of the shaft 31. The outer circumferential surface of the shaft 31 may be coated with, for example, a nitride film or a hydrocarbon film. This coating imparts improved wear resistance to the outer circumferential surface of the shaft 31.

The stationary portion 40 stands still relative to the housing 14. The stationary portion 40 preferably includes a base 41 and a stator 42. As illustrated in FIG. 1, the base 41 is arranged to constitute a part of the first housing member 141. The base 41 has a through hole 45 defined therein so as to have a center aligned with the center axis 9 and pass through the base 41 in the axial direction.

The stator 42 preferably includes a stator core 46 and a plurality of coils 47. The stator core 46 is made of a magnetic material. The stator core 46 is fixed to the base 41. The stator core 46 has a plurality of teeth 48 protruding outward in the radial direction. The coil 47 is an aggregate of wires wound around the respective teeth 48. Each of the teeth 48 has a surface preferably covered with, for example, an insulating coat or a member made of an insulating material. Each of the wires is wound around the corresponding tooth 48 with an insulating coat or a member made of an insulating material.

The rotary portion 50 is supported by the bearing mechanism 30 so as to rotate relative to the stationary portion 40 about the center axis 9 of the motor 20. The rotary portion 50 preferably includes a sleeve 51, a hub 52, and a magnet 53. The sleeve 51 has a tubular or substantially tubular shape and is arranged to extend axially around the bearing mechanism 30. The sleeve 51 has a center through hole 54 arranged therein so as to pass through the sleeve 51 in a lengthwise direction. At least a part of the bearing mechanism 30 is accommodated in the center through hole 54.

A lubricant 55 is applied between the bearing mechanism 30 and the sleeve 51. The sleeve 51 is supported by the bearing mechanism 30 via the lubricant 55 so as to rotate relative to the bearing mechanism 30. The rotary portion 50 may be supported by, for example, a ball bearing or a sliding bearing in place of the fluid dynamic bearing so as to rotate relative to the stationary portion 40.

The hub 52 is arranged radially outside the sleeve 51. The hub 52 is made of a metal such as a stainless alloy.

The hub 52 preferably has an upper plate portion 56, a cylindrical portion 57, and a disk mount portion 58. The upper plate portion 56 annularly extends at an upper side of the stator 42. The upper plate portion 56 extends outward in the radial direction from an upper end of the sleeve 51. The cylindrical portion 57 has a tubular or substantially tubular shape and is arranged to extend downward from a radially outer end of the upper plate portion 56. In other words, the upper plate portion 56 is arranged to extend inward in the radial direction from an upper end of the cylindrical portion 57. In the first preferred embodiment, the sleeve 51 and the upper plate portion 56 (i.e., the hub 52) are formed integrally with each other. However, the sleeve 51 and the upper plate portion 56 (i.e., the hub 52) may be independent of each other as separate members.

The disk mount portion 58 has a ring or substantially ring shape and is arranged to extend outward in the radial direction from an outer circumferential surface of the cylindrical portion 57. As illustrated in FIG. 2, the disk mount portion 58 is arranged to protrude outward in the radial direction from a lower side of the cylindrical portion 57. The lower one of the three magnetic disks 11 has a lower surface which is in contact with at least a part of a ring-shaped upper surface of the disk mount portion 58 in the axial direction. In other words, the upper surface of the disk mount portion 58 serves as a disk mount surface.

The magnet 53 has a cylindrical or substantially cylindrical shape and is fixed to an inner side of the cylindrical portion 57. The magnet 53 has an inner circumferential surface on which the north poles and the south poles are alternately magnetized in the circumferential direction. The inner circumferential surface of the magnet 53 is arranged opposite radially outer end surfaces of the teeth 48 in the radial direction with an interstice defined between the magnet 53 and the respective teeth 58. In other words, the magnet 53 has a magnetic pole surface disposed opposite the stator 42 in the radial direction.

In the motor 20, when a drive current is fed to the coil 47, magnetic fluxes generate at the teeth 48. By the action of magnetic fluxes between the respective teeth 48 and the magnet 53, torque generates between the stationary portion 40 and the rotary portion 50 in the circumferential direction. Thus, the rotary portion 50 rotates relative to the stationary portion 40 about the center axis 9. The magnetic disks 11 supported by the hub 52 also rotate together with the rotary portion 50 about the center axis 9.

The sealing member 60 has a one-end closed cylindrical or substantially cylindrical shape and has a recess 61. The sealing member 60 is made of, for example, aluminum, an aluminum alloy, or a stainless alloy. At least a lower end of the shaft 31 of the bearing mechanism 30 is fitted into and fixed to the recess 61. At least a part of the sealing member 60 is fitted into and fixed to the through hole 45. Thus, the sealing member 60 closes the through hole 45. This configuration contributes to preventing the gas from being leaked out of the housing 14 through the through hole 45.

An outer circumferential portion of the shaft 31 and an inner circumferential portion of the sealing member 60 are fixed together by, for example, press fitting or the like. This contributes to enhancing the strength of fastening the sealing member 60 and the shaft 31 together. The material for the sealing member 60 is preferably identical to the material for the shaft 31. As a result, the material for the sealing member 60 becomes almost identical in thermal expansion coefficient to the material for the shaft 31. This configuration maintains the strength of fastening the sealing member 60 and the shaft 31 together even if a temperature change occurs. The material for the sealing member 60 may be different from the material for the shaft 31 as long as these materials are almost identical in thermal expansion coefficient to each other.

Figure 3:
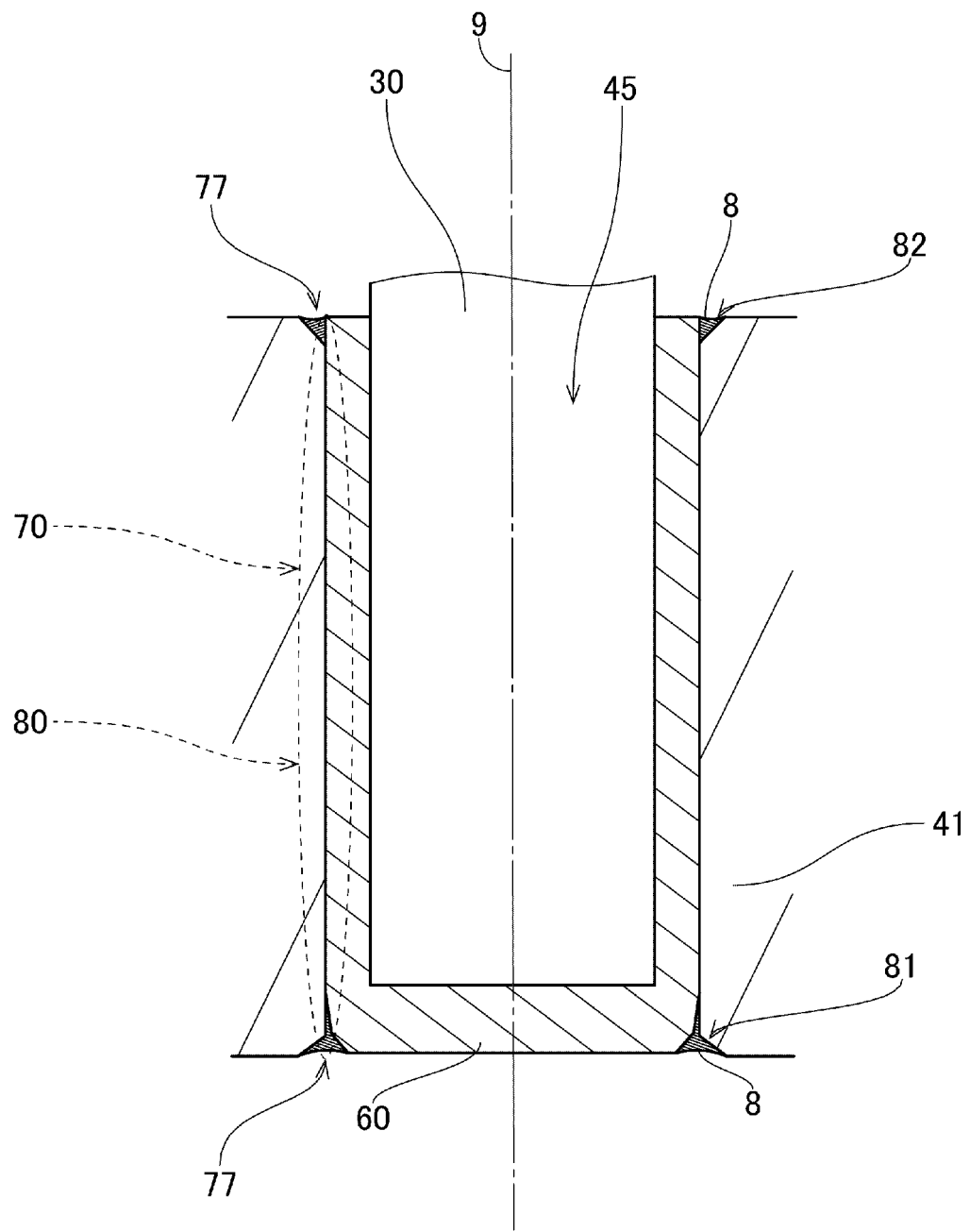
FIG. 3 is an enlarged sectional view of and around a through hole in the motor according to the first preferred embodiment.
Figure 4:
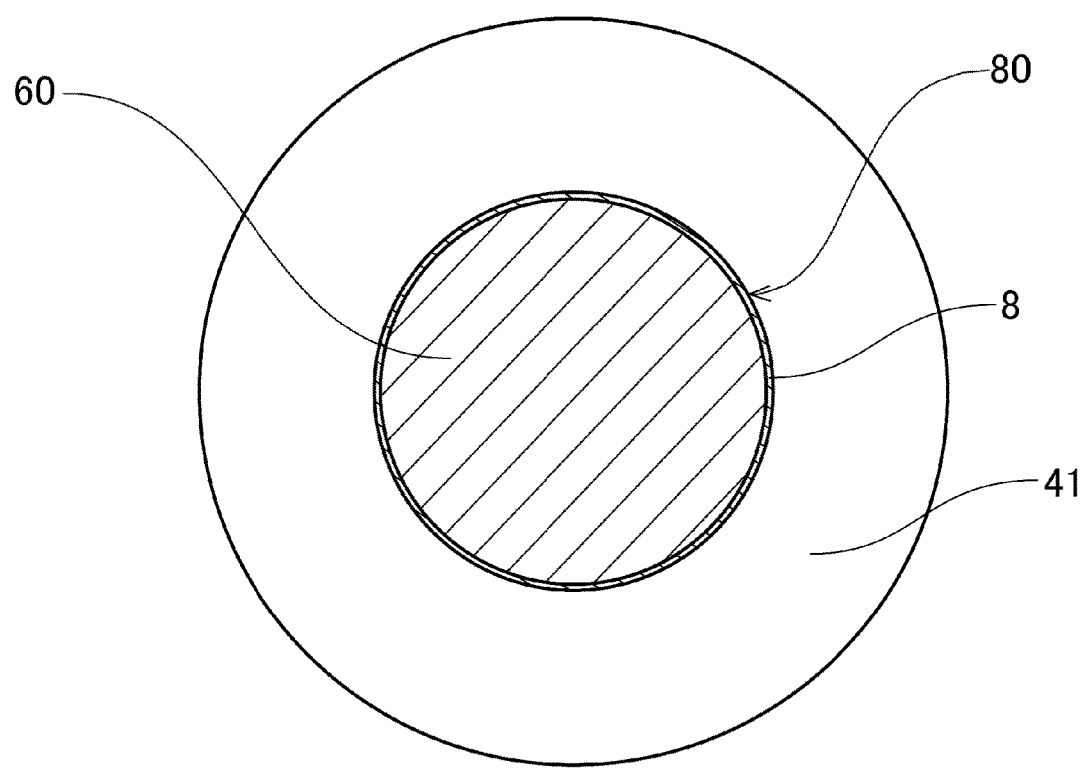
FIG. 4 is a transverse sectional view of and around the through hole in the motor according to the first preferred embodiment.

FIG. 3 is an enlarged sectional view of and around the through hole 45 in the motor 20 according to the first preferred embodiment. FIG. 4 is a transverse sectional view of and around the through hole 45 in the motor 20. The sealing member 60 is fixed to the base 41 in a fixing region 70 defined between an outer circumferential portion of the sealing member 60 and an inner circumferential portion that forms the through hole 45 in the base 41. The fixing region 70 includes a sealing region 80 where a clearance between the sealing member 60 and the base 41 is closed.

The sealing region 80 may be circumferentially applied with an adhesive 8. The adhesive 8 closes the slight clearance between the sealing member 60 and the base 41. This contributes to preventing the gas from being leaked out of the housing 14 through the through hole 45. An interstice, which is a ring-shaped clearance, may be circumferentially formed on a lower end of the sealing region 80 between the outer circumferential portion of the sealing member 60 and the inner circumferential portion of the base 41. For example, the interstice is defined in such a manner that a groove is defined in one of the sealing member 60 and the base 41. The interstice is circumferentially applied with the adhesive 8, so that a first sealing region 81 is defined on the sealing region 80. The interstice desirably has a radial dimension gradually decreased toward the upper side in the axial direction. In other words, at least one of the outer circumferential portion of the sealing member 60 and the inner circumferential portion of the base 41 is tapered with respect to the center axis 9 at the lower end of the sealing region 80. In the interstice, the sealing member 60 or the base 41 has a radial dimension gradually decreased toward the lower side in the axial direction. The adhesive 8 is adequately distributed throughout the interstice by the capillary action. Thus, the adhesive 8 is easily held between the sealing member 60 and the base 41 at a lower surface side of the base 41. With this configuration, the adhesive 8 is arranged in large amounts between the sealing member 60 and the base 41. This configuration contributes to an enhanced effect of sealing with the adhesive 8.

An interstice, which is a ring-shaped clearance, may be circumferentially arranged on an upper end of the sealing region 80 between the outer circumferential portion of the sealing member and the inner circumferential portion of the base 41. For example, the interstice is defined in such a manner that a groove is defined in one of the sealing member 60 and the base 41. The interstice is circumferentially applied with the adhesive 8, so that a second sealing region 82 is defined on the upper end of the sealing region 80. The interstice may have a radial dimension gradually decreased toward the lower side in the axial direction. In other words, at least one of the outer circumferential portion of the sealing member 60 and the inner circumferential portion of the base 41 is tapered with respect to the center axis 9. In the interstice, the sealing member 60 or the base 41 has a radial dimension gradually decreased toward the lower side in the axial direction. The adhesive 8 is adequately distributed throughout the interstice by the capillary action. Thus, the adhesive 8 is easily held between the sealing member 60 and the base 41 at an upper surface side of the base 41. With this configuration, the adhesive 8 is arranged in large amounts between the sealing member 60 and the base 41. This contributes to an enhanced effect of sealing with the adhesive 8.

A boundary 77 is defined between the inner circumferential portion of the base 41 and the outer circumferential portion of the sealing member 60. The boundary 77 may be circumferentially welded. This contributes to preventing the gas from being leaked out of the housing 14. The boundary 77 may be welded at the lower surface side of the base 41 or the upper surface side of the base 41. Alternatively, the boundary 77 may be welded at both the upper surface side of the base 41 and the lower surface side of the base 41. Alternatively, the boundary 77 may be welded at one of the upper surface side and the lower surface side of the base 41 and may be applied with the adhesive 8 at the other surface side of the base 41. The adhesive arranged to the first sealing region 81 may be different from the adhesive arranged to the second sealing region 82.

One of the outer circumferential surface of the sealing member 60 and the inner circumferential surface that defines the through hole 45 in the base 41 may be larger in surface roughness than the other circumferential surface. With this configuration, the adhesive 8 is held at the clearance between the outer circumferential surface of the sealing member 60 and the inner circumferential surface of the base 41. The adhesive 8 is preferably a thermosetting epoxy adhesive. Alternatively, the adhesive 8 may be, for example, an anaerobic adhesive or an ultraviolet curable adhesive.

A material for the base 41 is preferably the same as the material for the sealing member 60. As a result, the sealing member 60 becomes almost identical in thermal expansion coefficient to the base 41. This contributes to preventing an interstice from being defined between the outer circumferential portion of the sealing member 60 and the inner circumferential portion of the base 41 even if a temperature change occurs. Accordingly, this contributes to preventing the gas from being leaked out of the housing 14 even if a temperature change occurs. The material for the base 41 may be different from the material for the sealing member 60 as long as these materials are the same in thermal expansion coefficient as each other.

Figure 5:
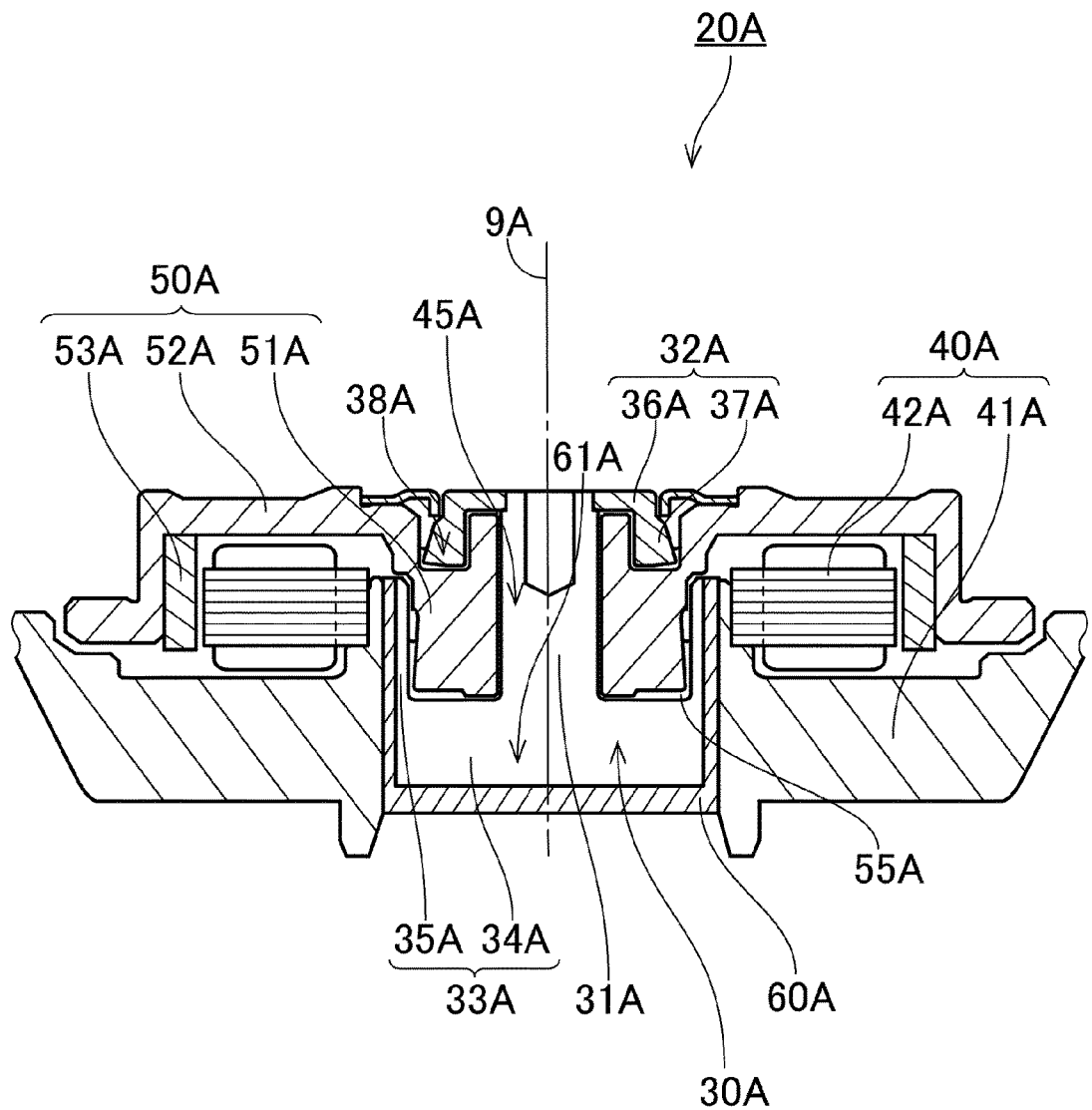
FIG. 5 is a longitudinal sectional view of a motor according to a second preferred embodiment.

FIG. 5 is a longitudinal sectional view of a motor 20A according to a second preferred embodiment. The motor 20A is of an outer rotor type for use in, for example, a disk drive apparatus. The motor 20A preferably includes a bearing mechanism 30A, a stationary portion 40A, a rotary portion 50A, and a sealing member 60A. The rotary portion 50A rotates relative to the stationary portion 40A about a center axis 9A. The rotary portion 50A preferably includes a sleeve 51A, a hub 52A, and a magnet 53A.

The stationary portion 40A preferably includes a base 41A and a stator 42A. The base 41A defines a part of a housing of a disk drive apparatus that includes the motor 20A. The base 41A has a through hole 45A arranged therein so as to have a center aligned with the center axis 9A and pass through the base 41A in the axial direction. The bearing mechanism 30A has a lower end fitted into and fixed to the sealing member 60A. In the following, similar configurations of the motor 20A to the configurations of the motor 20 according to the first preferred embodiment will not be described.

The bearing mechanism 30A preferably includes a shaft 31A, an upper cup 32A, a lower cup 33A, and a lubricant 55A. The lower cup 33A preferably has a bottom portion 34A and a wall portion 35A. The shaft 31A has a columnar or substantially columnar shape and is arranged to extend along the center axis 9A. The bottom portion 34A has a plate or substantially plate shape and is arranged to extend outward in the radial direction from a lower portion of the shaft 31A. The wall portion 35A has a cylindrical or substantially cylindrical shape and is arranged to extend upward in the axial direction from an outer edge of the bottom portion 34A. The lower cup 33A has a longitudinal section of an almost U shape formed from the bottom portion 34A and the wall portion 35A. In the motor 20A, the shaft 31A and the lower cup 33A are integrally formed with each other. However, the shaft 31A and the lower cup 33A may be independent of each other as separate members.

The upper cup 32A has a plate portion 36A and a tube portion 37A. The plate portion 36A has a disc shape and is arranged to extend outward in the radial direction from the shaft 31A. The plate portion 36A is fixed to an outer circumferential surface of the shaft 31A. The tube portion 37A has a cylindrical or substantially cylindrical shape and is arranged to extend downward in the axial direction from an outer edge of the plate portion 36A. The upper cup 32A has a longitudinal section of an almost U shape formed from the plate portion 36A and the tube portion 37A.

The shaft 31A is inserted into a radially inner side of the sleeve 51A of the rotary portion 50A. The sleeve 51A is inserted into a radially inner side of the wall portion 35A of the lower cup 33A. The sleeve 51A has an upper surface in which an annular recess 38A is defined. The annular recess 38A has a ring shape or substantially ring shape and is arranged to extend downward from the upper surface of the sleeve 51A. The annular recess 38A receives the tube portion 37A of the upper cup 32A.

The lubricant 55A is applied to a minute interstice between the sleeve 51A and each of the shaft 31A, the upper cup 32A, and the lower cup 33A. The lubricant 55A has an upper interface formed between an outer circumferential surface of the tube portion 37A of the upper cup 32A and an inner circumferential surface that defines the annular recess 38A in the sleeve 51A. The lubricant 55A also has a lower interface formed between an inner circumferential surface of the wall portion 35A of the lower cup 33A and an outer circumferential surface of the sleeve 51A. With this configuration, the rotary portion 50A including the sleeve 51A is supported by the shaft 31A, the upper cup 32A, and the lower cup 33A via the lubricant 55A so as to rotate relative to the shaft 31A, the upper cup 32A, and the lower cup 33A.

The sealing member 60A has a one-end closed cylindrical or substantially cylindrical shape and has a recess 61A. At least a lower end of the bearing mechanism 30A is fitted into the recess 61A. At least a part of the sealing member 60A is fitted into and fixed to the through hole 45A. Thus, the sealing member 60A covers the through hole 45A. Also in the motor 20A, this contributes to preventing a gas from being leaked out of the housing.

Figure 6:
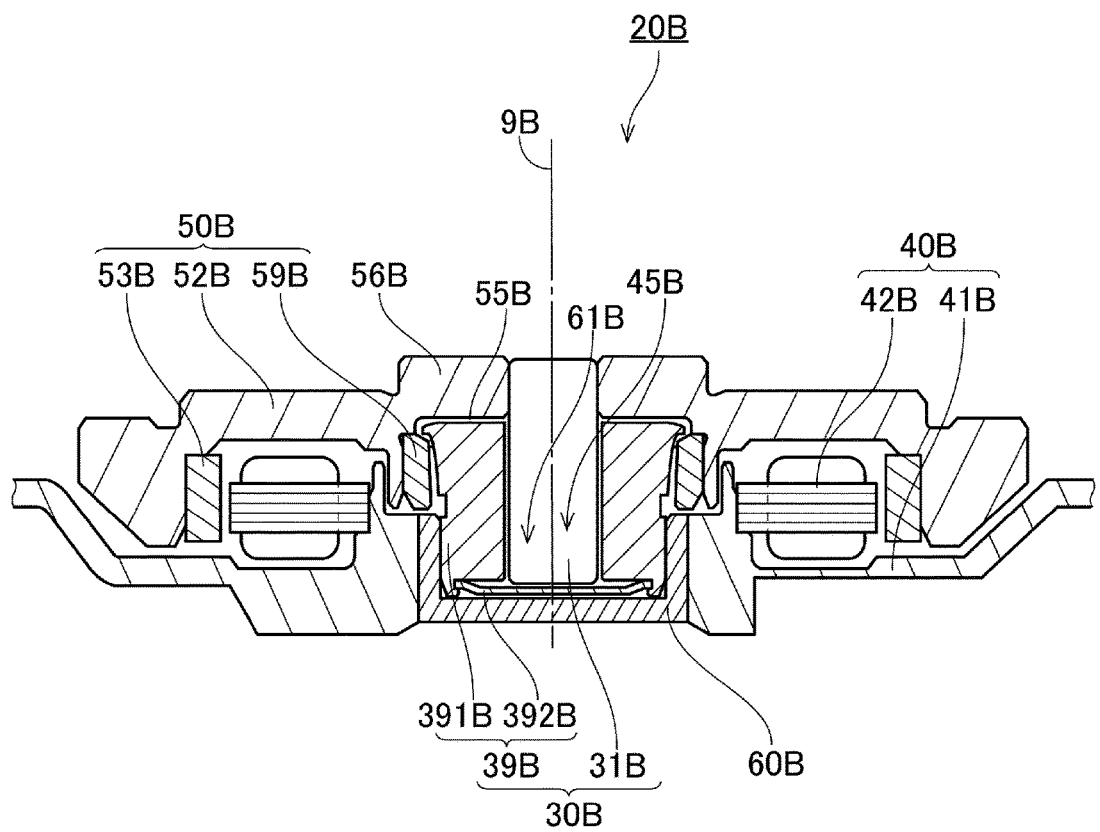
FIG. 6 is a longitudinal sectional view of a motor according to a third preferred embodiment.

FIG. 6 is a longitudinal sectional view of a motor 20B according to a third preferred embodiment. The motor 20B is of an outer rotor type for use in, for example, a disk drive apparatus. The motor 20B preferably includes a bearing mechanism 30B, a stationary portion 40B, a rotary portion 50B, and a sealing member 60B. The rotary portion 50B rotates relative to the stationary portion 40B about a center axis 9B. In the following, similar configurations of the motor 20B to the configurations of the motor according to the first preferred embodiment will not be described.

The stationary portion 40B preferably includes a base 41B and a stator 42B. The base 41B defines a part of a housing of a disk drive apparatus that includes the motor 20B. The base 41B has a through hole 45B arranged therein so as to have a center aligned with the center axis 9B and pass through the base 41B in the axial direction. The bearing mechanism 30B has a lower end fitted into and fixed to the sealing member 60B. The rotary portion 50B preferably includes a hub 52B, a magnet 53B, and an annular member 59B.

The bearing mechanism 30B preferably includes a shaft 31B and a stationary bearing unit 39B. The shaft 31B has a columnar shape and is arranged to extend along the center axis 9B. The shaft 31B has an upper portion fixed to an inner end of an upper plate portion 56B of the hub 52B. With this configuration, the shaft 31B rotates relative to the stationary portion 40B in conjunction with the rotary portion 50B.

The stationary bearing unit 39B preferably includes a sleeve 391B and a cap 392B. The sleeve 391B a cylindrical or substantially cylindrical shape and is arranged to extend axially around the shaft 31B. The sleeve 391B has a lower portion accommodated in the sealing member 60B.

An inner circumferential surface of the sleeve 391B is arranged opposite an outer circumferential surface of the shaft 31B in the radial direction. The cap 392B covers a lower opening in the sleeve 391B.

A lubricant 55B is applied to a minute interstice between the stationary bearing unit 39B and each of the shaft 31B, the upper plate portion 56B of the hub 52B, and the annular member 59B. The lubricant 55B has an interface defined between the sleeve 391B and the annular member 59B. With this configuration, the shaft 31B, the hub 52B, and the annular member 59B are supported by the stationary bearing unit 39B via the lubricant 55B so as to rotate relative to the stationary bearing unit 39B.

The sealing member 60B has a one-end closed cylindrical or substantially cylindrical shape and has a recess 61B. At least a lower end of the bearing mechanism 30B is fitted into the recess 61B. At least a part of the sealing member 60B is fitted into and fixed to the through hole 45B. Thus, the sealing member 60B closes the through hole 45B. Also in the motor 20B, this prevents a gas from being leaked out of the housing.

The foregoing description concerns the exemplary preferred embodiments of the disclosure; however, the present invention is not limited to the foregoing preferred embodiments.

Figure 7:
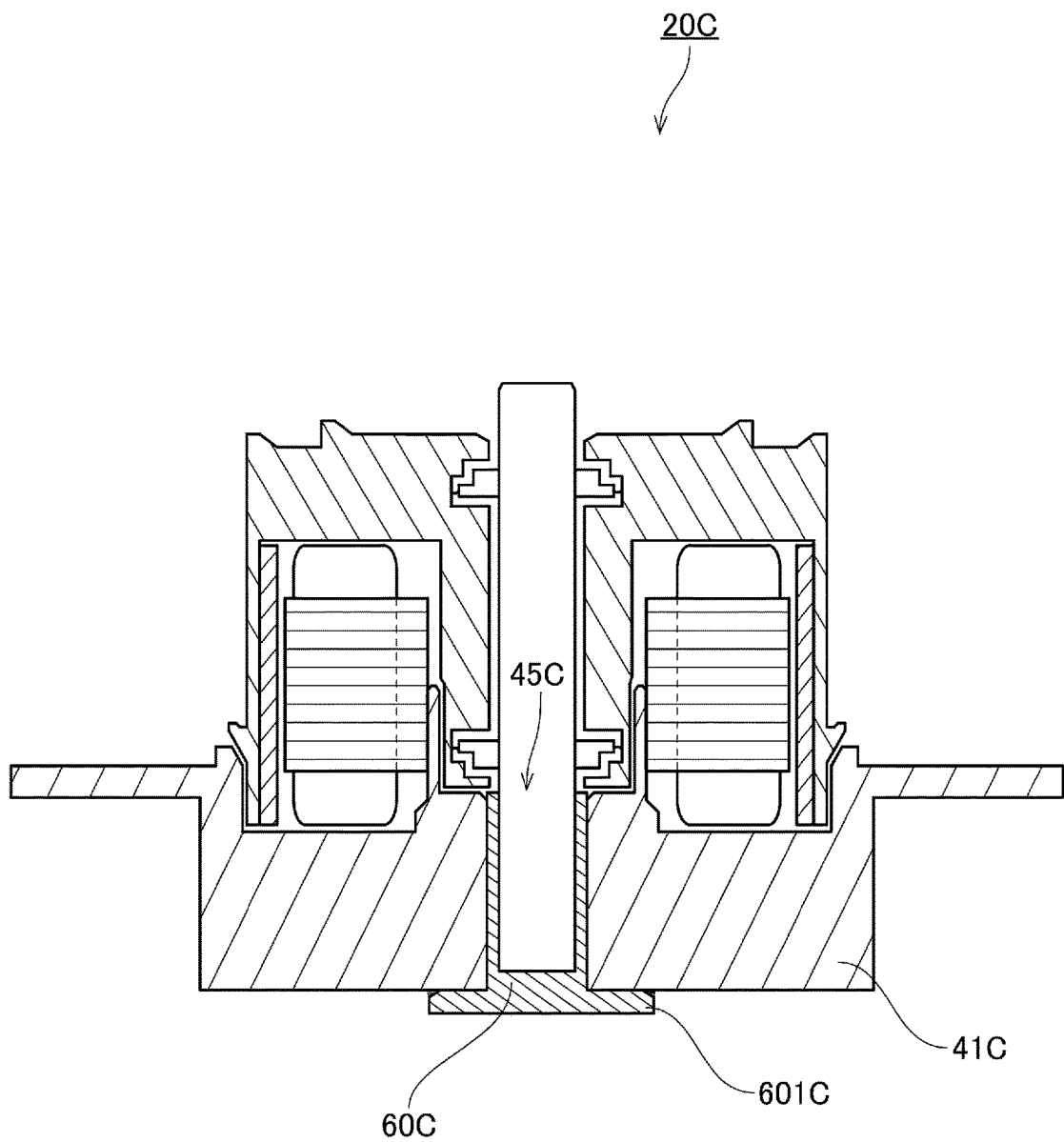
FIG. 7 is a longitudinal sectional view of a motor according to a first modification.
Figure 8:
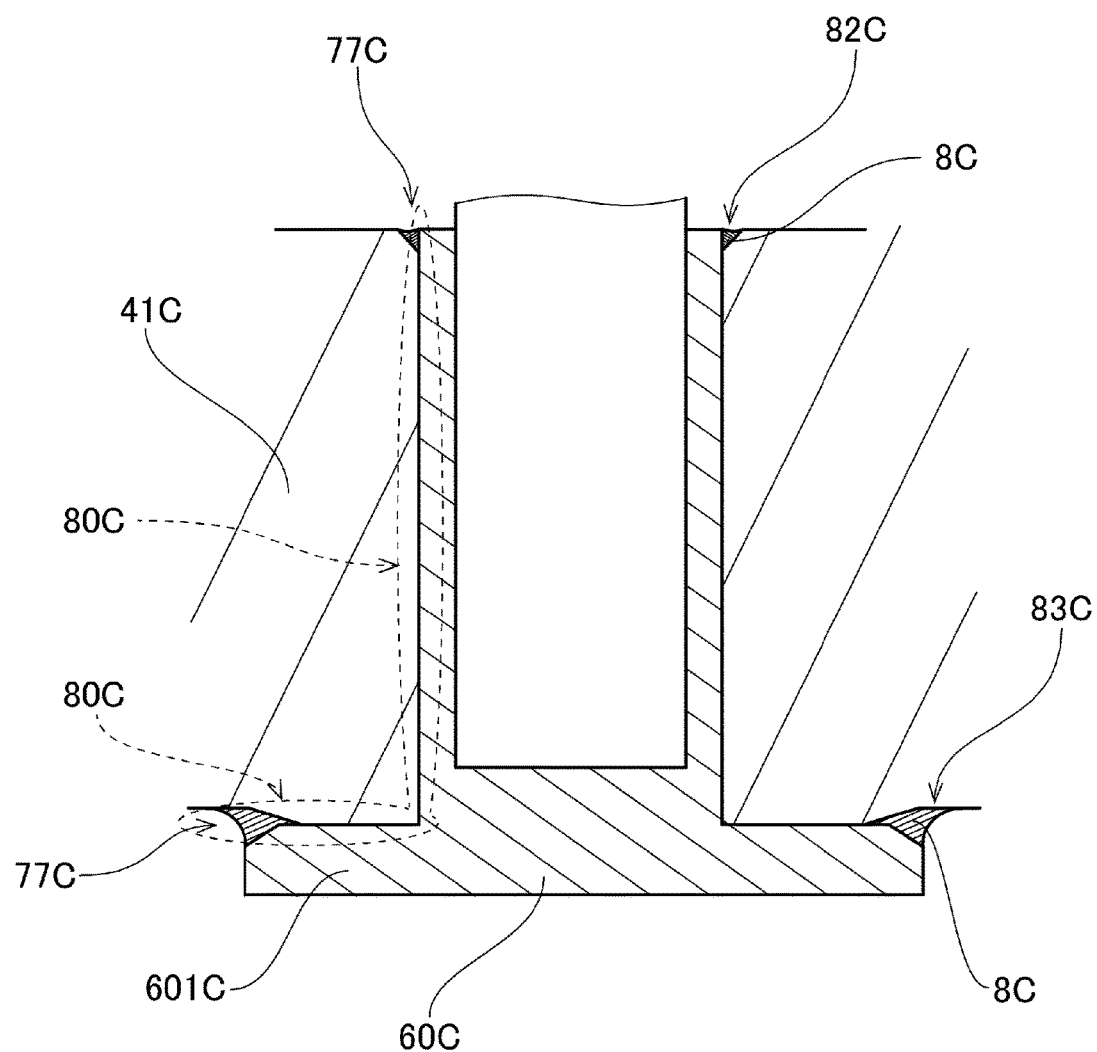
FIG. 8 is an enlarged sectional view of and around a through hole in the motor according to the first preferred modification.

FIG. 7 is a longitudinal sectional view of a motor 20C according to a first preferred modification. FIG. 8 is an enlarged sectional view of and around a through hole 45C in the motor 20C. In the motor 20C, a sealing member 60C has a first flange 601C extending outward in the radial direction from a lower side surface of the sealing member 60C. The first flange 610C covers at least a part of a lower surface of a base 41C from a lower opening in the base 41C to a radially outer side of the base 41C. The first flange 601C has an upper surface overlapping with the lower surface of the base 41C in the axial direction. With this configuration, a sealing region 80C, where a clearance between the base 41C and the sealing member 60C is closed, is defined on the lower surface of the base 41C. An adhesive 8C may be arranged between the lower surface of the base 41C and the sealing member 60C.

As illustrated in FIG. 8, an interstice, which is a ring-shaped clearance, may be circumferentially defined on a radially outer end of the first flange 601C between the upper surface of the first flange 601C and the lower surface of the base 41C. The interstice is circumferentially applied with an adhesive 8C, so that a third sealing region 83C is defined. In the third sealing region 83C, the adhesive 8C closes the interstice between the upper surface of the first flange 601C and the lower surface of the base 41C. The interstice may have an axial dimension gradually decreased inward in the radial direction. In other words, at least one of the upper surface of the first flange 601C and the lower surface of the base 41C is tapered with respect to a center axis. In the interstice, a radial dimension between the upper surface of the first flange 601C and the lower surface of the base 41C is gradually decreased. The adhesive 8C is adequately distributed throughout the interstice by the capillary action. Thus, the adhesive 8C is easily held between the first flange 601C and the base 41C. With this configuration, the adhesive 8C is arranged in large amounts between the first flange 601C and the base 41C. This configuration contributes to an enhanced effect of sealing with the adhesive 8C.

A boundary 77C is defined between the radially outer end of the first flange 601C and the lower surface of the base 41C. The boundary 77C may be circumferentially welded. In the third sealing region 83C, the boundary 77C is defined between the lower surface of the base 41C and the upper end of the first flange 601C. The boundary 77C may also be circumferentially welded. In a second sealing region 82C, the boundary 77C is defined between an upper end of an inner circumferential portion of the base 41C and an upper end of an outer circumferential portion of the sealing member 60C. The boundary 77C may also be circumferentially welded.

Figure 9:
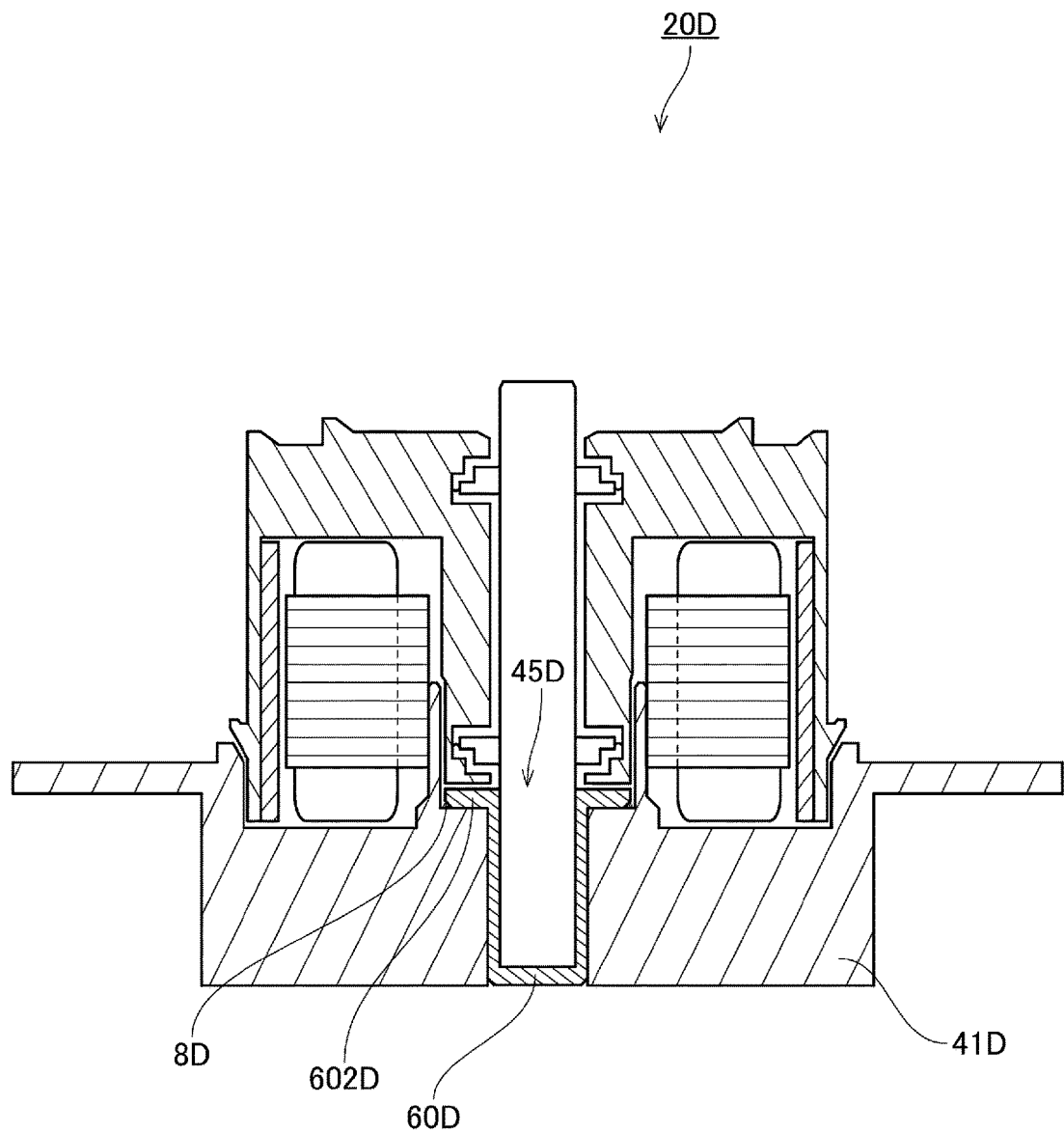
FIG. 9 is a longitudinal sectional view of a motor according to a second preferred modification.
Figure 10:
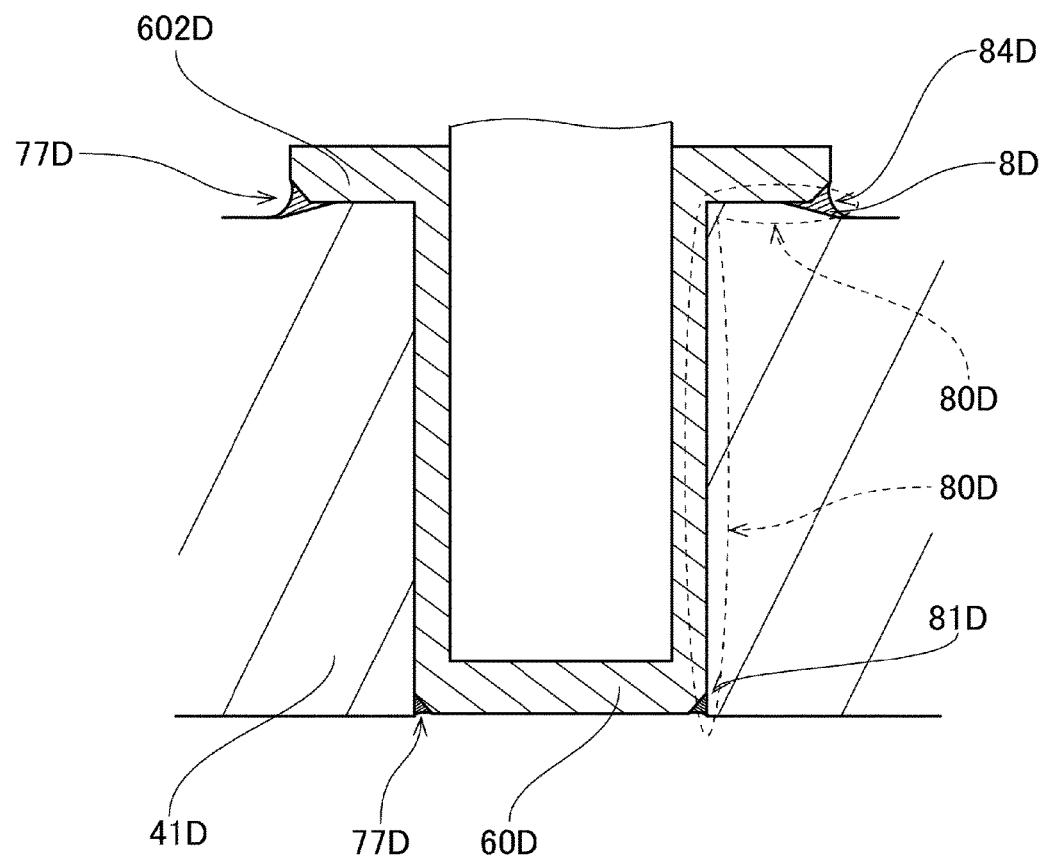
FIG. 10 is an enlarged sectional view of and around a through hole in the motor according to the second preferred modification.

FIG. 9 is a longitudinal sectional view of a motor 20D according to a second preferred modification. FIG. 10 is an enlarged sectional view of and around a through hole 45D in the motor 20D. In the motor 20D, a sealing member 60D has a second flange 602D extending outward in the radial direction from an upper side surface of the sealing member 60D. The second flange 602D covers at least a part of an upper surface of a base 41D from an upper opening in the base 41D to a radially outer side of the base 41D. The second flange 602D has a lower surface overlapping with the upper surface of the base 41D in the axial direction. With this configuration, a sealing region 80D, where a clearance defined between the base 41D and the sealing member 60D is closed, is defined also on the upper surface of the base 41D. An adhesive 8D may be arranged between the upper surface of the base 41D and the sealing member 60D.

As illustrated in FIG. 10, an interstice, which is a ring-shaped clearance, may be circumferentially defined on a radially outer end of the second flange 602D between the lower surface of the second flange 602D and the upper surface of the base 41D. The interstice is circumferentially arranged with the adhesive 8D, so that a fourth sealing region 84D is defined. The interstice may have an axial dimension gradually decreased inward in the radial direction. In other words, at least one of the lower surface of the second flange 602D and the upper surface of the base 41D is tapered with respect to a center axis. In the interstice, a radial dimension between the lower surface of the second flange 602D and the upper surface of the base 41D is gradually decreased toward the lower side in the axial direction. The adhesive 8D is adequately distributed throughout the interstice by the capillary action. Thus, the adhesive 8D is easily held between the second flange 602D and the base 41D. With this configuration, the adhesive 8D is arranged in large amounts between the second flange 602D and the base 41D. This contributes to an enhanced effect of sealing with the adhesive 8D.

A boundary 77D is defined between the radially outer end of the second flange 602D and the upper surface of the base 41D. The boundary 77D may be circumferentially welded. In a fourth sealing region 84D, the boundary 77D is defined between a lower end of an inner circumferential portion of the base 41D and a lower end of an outer circumferential portion of the sealing member 60D, at the lower surface side of the base 41D. The boundary 77D may also be circumferentially welded. In a first sealing region 81D, the boundary 77D is defined between the lower end of the inner circumferential portion of the base 41D and the lower end of the outer circumferential portion of the sealing member 60D. The boundary 77D may also be circumferentially welded.

Figure 11:
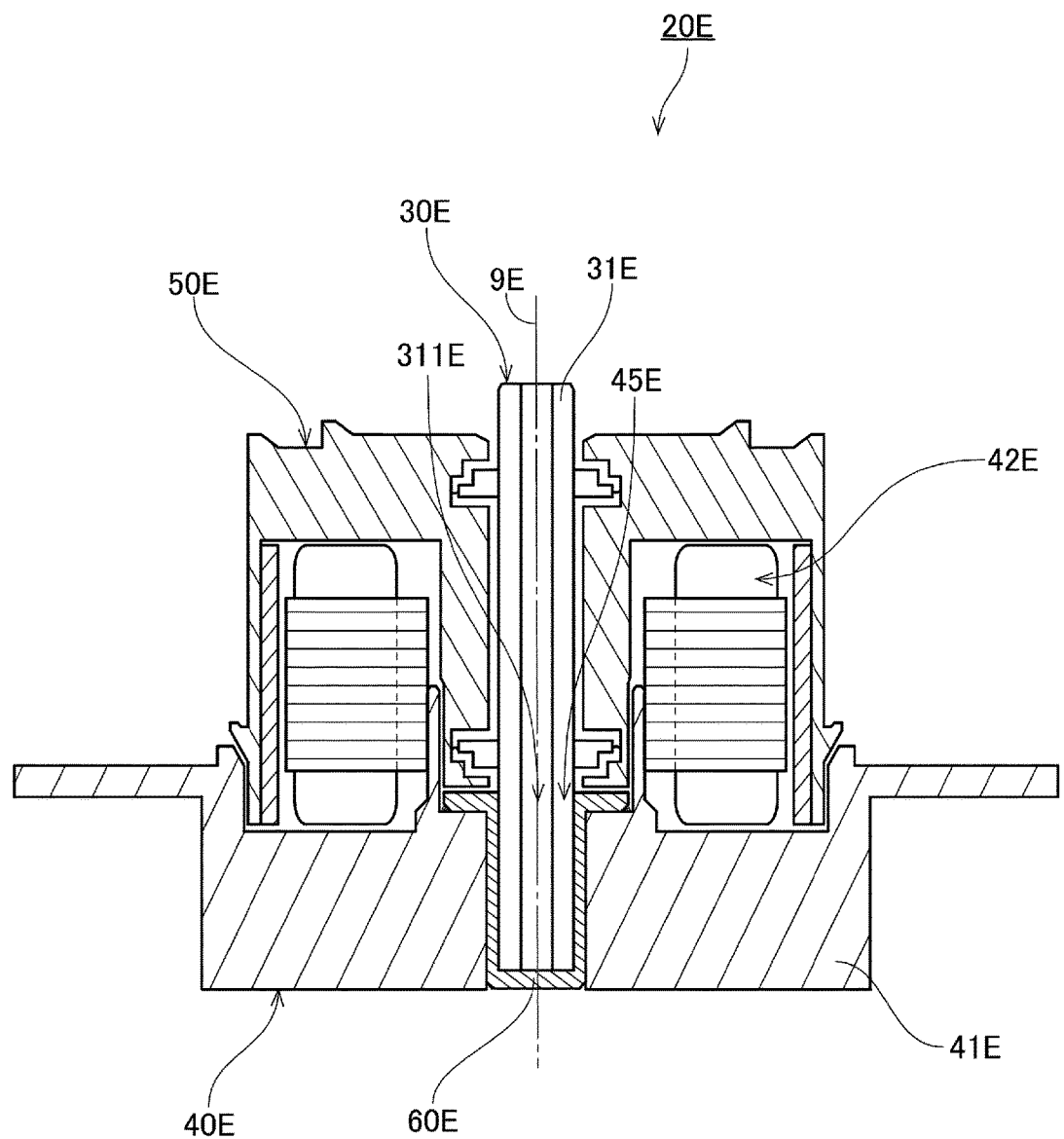
FIG. 11 is a longitudinal sectional view of a motor according to a third preferred modification.

FIG. 11 is a longitudinal sectional view of a motor 20E according to a third preferred modification. The motor 20E is of an outer rotor type for use in, for example, a disk drive apparatus. The motor 20E preferably includes a bearing mechanism 30E, a stationary portion 40E, a rotary portion 50E, and a sealing member 60E. The stationary portion 40E preferably includes a base 41E and a stator 42E. The base 41E defines a part of a housing of a disk drive apparatus that includes the motor 20E. The base 41E has a through hole 45E defined therein so as to have a center aligned with a center axis 9E and pass through the base 41E in the axial direction. The bearing mechanism 30E has a lower end fitted into and fixed to the sealing member 60E.

The bearing mechanism 30E preferably includes a shaft 31E. The shaft 31E has a communication hole 311E defined at a center thereof so as to extend in the axial direction. The rotary portion 50E rotates relative to the stationary portion 40E about the center axis 9E. At least a part of the sealing member 60E is fitted into and fixed to the through hole 45E. Thus, the sealing member 60E closes the through hole 45E and the communication hole 311E. This contributes to preventing a gas from being leaked out of the housing through the through hole 45E and the communication hole 311E.

The detailed shape of any member may be different from the shape thereof as illustrated in the accompanying drawings of the present application. Moreover, the features of the foregoing preferred embodiments and modifications may be combined appropriately as long as no conflict arises.

Exemplary preferred embodiments of the disclosure are applicable to, for example, a spindle motor and a disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor used in a disk drive apparatus to drive a disk, the disk drive apparatus including a housing defining an interior space, the spindle motor comprising:
 a bearing mechanism including a shaft having a center axis as a center thereof;
 a sealing member having a one-end closed cylindrical shape and a recess receiving a lower portion of the bearing mechanism;
 a stationary portion including a base defining a portion of the housing; and
 a rotary portion that rotates relative to the stationary portion about the center axis via the bearing mechanism,
 wherein
 the base includes a through hole defined therein so as to have a center aligned with the center axis and pass through the base in an axial direction,
 the sealing member is fixed to the through hole,
 the sealing member is fixed in a fixing region defined between an outer circumferential portion of the sealing member and an inner circumferential portion that defines the through hole in the base,
 the fixing region includes a sealing region where a clearance defined between the sealing member and the base is closed,
 the sealing member includes a flange extending outward in a radial direction from a lower side surface of the sealing member,
 the flange includes an upper surface overlapping with a lower surface of the base in the axial direction such that portions of the flange are positioned axially lower than axially lowermost portions of the lower surface of the base, and
 an adhesive is provided between the upper surface of the flange and the lower surface of the base.

2. The spindle motor according to claim 1, wherein the sealing region is circumferentially applied with an adhesive.

3. The spindle motor according to claim 1, wherein the sealing region includes a first sealing region where an interstice is defined between the inner circumferential portion of the base and the outer circumferential portion of the sealing member, at a lower surface side of the base, and
 the first sealing region is circumferentially applied with an adhesive.

4. The spindle motor according to claim 1, wherein a boundary between the outer circumferential portion of the sealing member and the inner circumferential portion that defines the through hole in the base is circumferentially welded at a lower surface side of the base.

5. The spindle motor according to claim 1, wherein the sealing region includes a second sealing region where an interstice is defined between the inner circumferential portion of the base and the outer circumferential portion of the sealing member, at an upper surface side of the base, and
 the second sealing region is circumferentially applied with an adhesive.

6. The spindle motor according to claim 1, wherein a boundary between the outer circumferential portion of the sealing member and the inner circumferential portion that defines the through hole in the base is circumferentially welded at an upper surface side of the base.

7. The spindle motor according to claim 1, wherein an outer circumferential portion of the bearing mechanism and an inner circumferential portion of the sealing member are fixed together by press fitting.

8. The spindle motor according to claim 1, wherein the sealing region includes a third sealing region where an interstice is defined between the upper surface of the flange and the lower surface of the base, and
 the third sealing region is circumferentially applied with an adhesive.

9. The spindle motor according to claim 1, wherein a boundary between a radially outer end of the flange and the lower surface of the base is circumferentially welded.

10. A disk drive apparatus comprising:
 the spindle motor of claim 1, arranged to rotate a disk;
 an access unit arranged to perform at least one of data read from and data write to the disk;
 a clamper arranged to clamp the disk; and
 a housing having a top cover and accommodating the disk, the spindle motor, the access unit, and the clamper.

* * * * *